(12) United States Patent
Zhang et al.

(10) Patent No.: US 9,580,958 B2
(45) Date of Patent: Feb. 28, 2017

(54) LOUVER ROLLER MECHANISM AND ROLLER SYSTEM WITH GEAR CLUTCH TURNING MECHANISM

(71) Applicant: HANGZHOU WOKASOLAR TECHNOLOGY CO., LTD., Hangzhou, Zhejiang (CN)

(72) Inventors: Yifei Zhang, Hangzhou (CN); Chengshang Wu, Hangzhou (CN)

(73) Assignee: HANGZHOU WOKASOLAR TECHNOLOGY CO., LTD., Hangzhou (CN)

( * ) Notice: Subject to any disclaimer, the term of this patent is extended or adjusted under 35 U.S.C. 154(b) by 121 days.

(21) Appl. No.: 14/418,451

(22) PCT Filed: Jul. 28, 2013

(86) PCT No.: PCT/CN2013/080256
§ 371 (c)(1),
(2) Date: Jan. 30, 2015

(87) PCT Pub. No.: WO2014/019480
PCT Pub. Date: Feb. 6, 2014

(65) Prior Publication Data
US 2015/0184458 A1 Jul. 2, 2015

(30) Foreign Application Priority Data

Jul. 30, 2012 (CN) .......................... 2012 1 0271697

(51) Int. Cl.
*E06B 9/28* (2006.01)
*E06B 9/68* (2006.01)
(Continued)

(52) U.S. Cl.
CPC ................. *E06B 9/68* (2013.01); *E06B 9/308* (2013.01); *E06B 9/322* (2013.01); *E06B 9/44* (2013.01); *F16D 13/08* (2013.01)

(58) Field of Classification Search
CPC .............. E06B 9/322; E06B 9/68; E06B 9/30; E06B 9/305; E06B 9/306; E06B 9/308; E06B 9/303; E06B 9/307
(Continued)

(56) References Cited

U.S. PATENT DOCUMENTS 4,200,135 A * 4/1980 Hennequin ............... E06B 9/32
160/168.1 R
4,621,673 A * 11/1986 Georgopoulos .......... E06B 9/32
160/168.1 R
(Continued)

FOREIGN PATENT DOCUMENTS

| CA | WO 9627727 A1 * | 9/1996 | ............. E06B 9/308 |
| CN | 2525230 Y | 12/2002 | |

(Continued)

*Primary Examiner* — Katherine Mitchell
*Assistant Examiner* — Johnnie A Shablack
(74) *Attorney, Agent, or Firm* — Wayne & King LLC

(57) ABSTRACT

A louver roller mechanism is described herein. The louver roller mechanism comprises a turning cylinder in which at least one roller is mounted, a turning cylinder cover is mounted at the opening of the turning cylinder, the turning cylinder and the turning cylinder cover are sequentially and axially mounted on a rotating shaft, and a square shaft is mounted in the rotating shaft. A roller system consisting of a roller mechanism and a gear clutch turning mechanism is also described, which comprises a base and a top cover. The roller mechanism and the gear clutch turning mechanism are set on the base, the roller mechanism is wound with ladder tapes, the roller mechanism is in axial connection with the gear clutch turning mechanism, and the roller mechanism and the gear clutch turning mechanism are driven to rotate by the square shaft.

9 Claims, 12 Drawing Sheets

(51) Int. Cl.
  *E06B 9/308* (2006.01)
  *E06B 9/322* (2006.01)
  *E06B 9/44* (2006.01)
  *F16D 13/08* (2006.01)

(58) Field of Classification Search
  USPC ............... 607/166.1, 174 R, 177 R, 178.1 R,
              168.1 R, 607/170, 173 R, 176.1 R
  See application file for complete search history.

(56) References Cited

U.S. PATENT DOCUMENTS

| | | | | |
|---|---|---|---|---|
| 5,123,472 A * | 6/1992 | Nagashima | ............ | E06B 9/307 160/170 |
| 5,297,608 A * | 3/1994 | Rap | ............ | E06B 9/307 160/177 R |
| 5,628,356 A * | 5/1997 | Marocco | ............ | E06B 9/308 160/170 |
| 5,638,882 A * | 6/1997 | Morris | ............ | E06B 9/308 160/176.1 R |
| 5,957,184 A * | 9/1999 | Gross | ............ | E06B 9/322 160/177 R |
| 6,076,587 A * | 6/2000 | Pastor | ............ | E06B 9/307 160/115 |
| 6,189,596 B1 * | 2/2001 | Chen | ............ | E06B 9/303 160/176.1 R |
| RE37,143 E * | 4/2001 | Liu | ............ | E06B 9/361 160/177 R |
| 6,240,999 B1 * | 6/2001 | Koster | ............ | B21B 1/227 160/107 |
| 6,318,441 B1 * | 11/2001 | Love | ............ | E06B 9/303 160/178.1 R |
| 6,325,131 B1 * | 12/2001 | Dekker | ............ | E06B 9/322 160/170 |
| 6,561,253 B1 * | 5/2003 | Hsiao | ............ | E06B 9/322 160/177 R |
| 6,845,802 B1 * | 1/2005 | Anderson | ............ | E06B 9/307 160/115 |
| 7,137,430 B2 * | 11/2006 | Fraczek | ............ | E06B 9/303 160/170 |
| 7,258,297 B2 * | 8/2007 | Liu | ............ | E06B 9/322 160/176.1 R |
| 7,287,569 B2 * | 10/2007 | Lin | ............ | E06B 9/303 160/170 |
| 7,464,742 B2 * | 12/2008 | Oskam | ............ | E06B 9/322 160/170 |
| 7,520,310 B2 * | 4/2009 | Colosio | ............ | E06B 9/307 160/168.1 P |
| 7,913,738 B2 * | 3/2011 | Fraser | ............ | E06B 9/322 160/115 |
| 8,267,145 B2 * | 9/2012 | Fraser | ............ | E06B 9/307 160/115 |
| 8,281,843 B2 * | 10/2012 | Yu | ............ | E06B 9/303 160/170 |
| 8,485,242 B2 * | 7/2013 | Fraser | ............ | E06B 9/322 160/115 |
| 8,522,852 B2 * | 9/2013 | Yu | ............ | E06B 9/322 160/170 |
| 8,746,320 B2 * | 6/2014 | Yu | ............ | E06B 9/322 160/170 |
| 8,887,792 B2 * | 11/2014 | Di Stefano | ............ | E06B 9/42 160/238 |
| 9,078,537 B2 * | 7/2015 | Lee | ............ | A47H 5/032 |
| 9,091,115 B2 * | 7/2015 | Mullet | ............ | E06B 9/307 |
| 9,163,452 B2 * | 10/2015 | Zhang | ............ | E06B 9/386 |
| 2003/0127197 A1 * | 7/2003 | Lai | ............ | E06B 9/303 160/115 |
| 2003/0168188 A1 * | 9/2003 | Wen | ............ | E06B 9/308 160/168.1 P |
| 2007/0012407 A1 * | 1/2007 | Nien | ............ | E06B 9/307 160/170 |
| 2007/0253768 A1 * | 11/2007 | Li | ............ | E06B 9/174 403/305 |
| 2007/0261797 A1 * | 11/2007 | Fraser | ............ | E06B 9/322 160/168.1 R |
| 2008/0053627 A1 * | 3/2008 | Lin | ............ | E06B 9/322 160/170 |
| 2008/0179017 A1 * | 7/2008 | Yu | ............ | E06B 9/322 160/84.05 |
| 2008/0251624 A1 * | 10/2008 | Fraczek | ............ | E06B 9/322 242/389 |
| 2009/0314440 A1 * | 12/2009 | Lai | ............ | E06B 9/303 160/170 |
| 2010/0065226 A1 * | 3/2010 | Fraser | ............ | E06B 9/322 160/168.1 R |
| 2010/0186907 A1 * | 7/2010 | Kraler | ............ | E06B 9/322 160/176.1 P |
| 2015/0184457 A1 * | 7/2015 | Zhang | ............ | E06B 9/322 160/133 |
| 2015/0184458 A1 * | 7/2015 | Zhang | ............ | E06B 9/308 160/133 |
| 2015/0211296 A1 * | 7/2015 | Zhang | ............ | E06B 9/303 160/133 |

FOREIGN PATENT DOCUMENTS

| | | | | |
|---|---|---|---|---|
| CN | 2727374 Y | 9/2005 | | |
| CN | 1795317 A | 6/2006 | | |
| CN | 101818616 A | 9/2010 | | |
| CN | 102071871 A | 5/2011 | | |
| CN | WO 2014019481 A1 * | 2/2014 | ............ | E06B 9/303 |
| CN | EP 2881534 A1 * | 6/2015 | ............ | E06B 9/308 |
| FR | EP 2397645 A1 * | 12/2011 | ............ | E06B 9/322 |
| JP | WO 2014181706 A1 * | 11/2014 | ............ | E06B 9/303 |

* cited by examiner

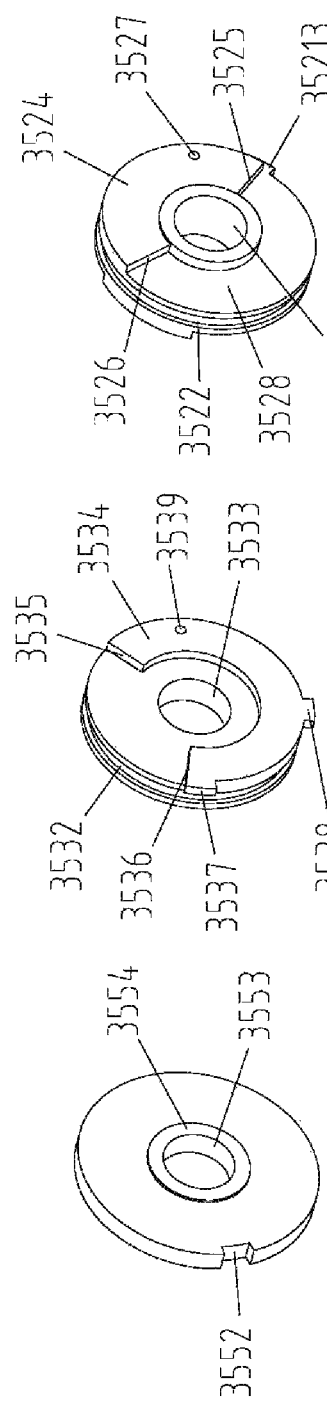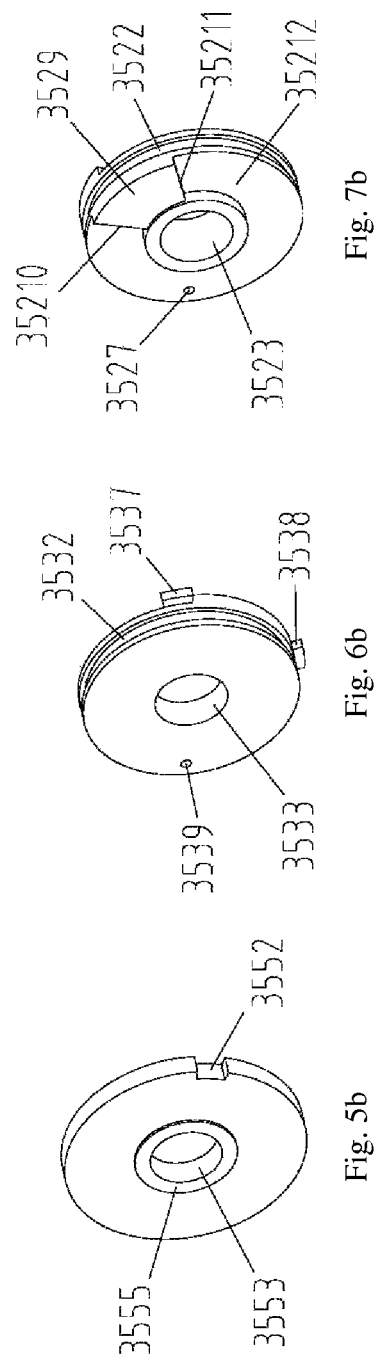

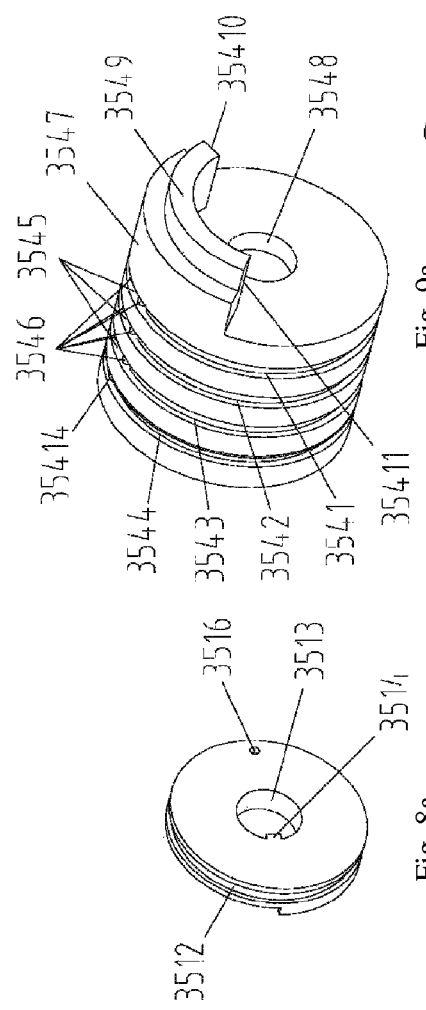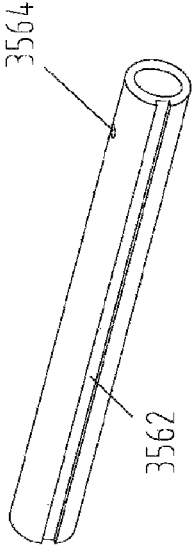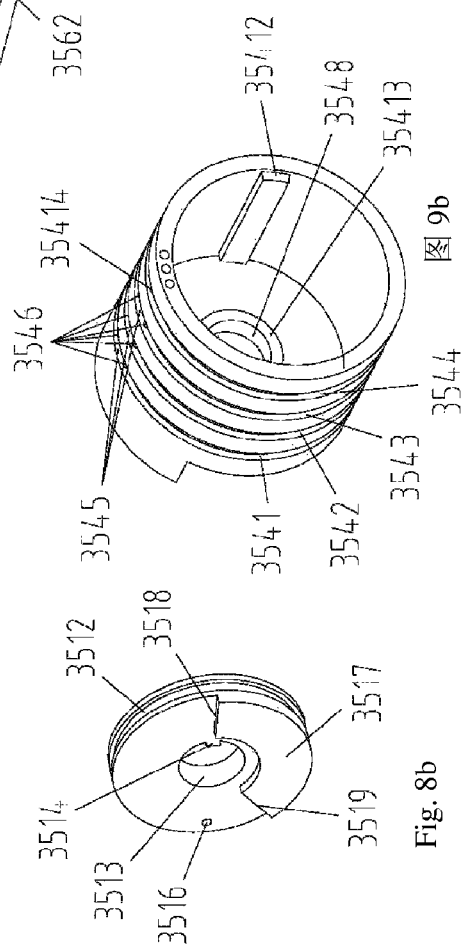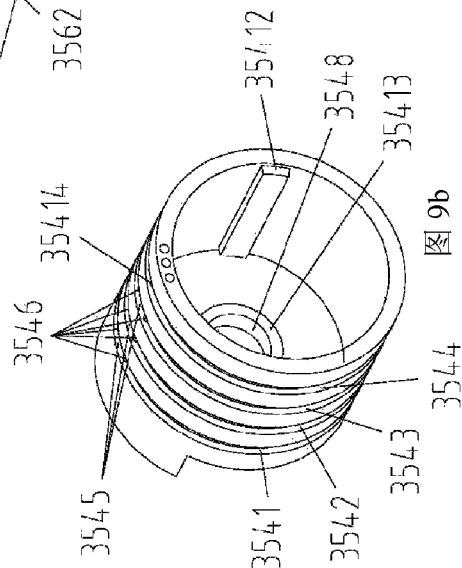

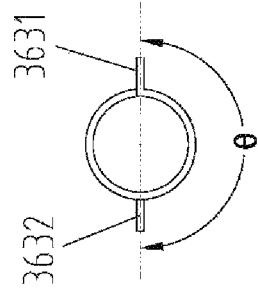
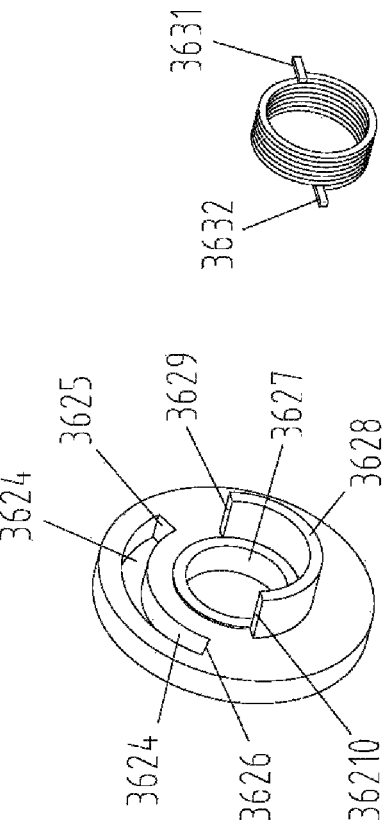
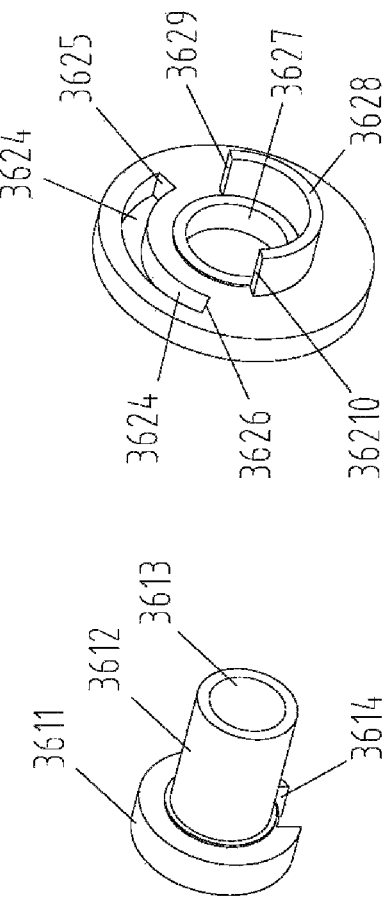
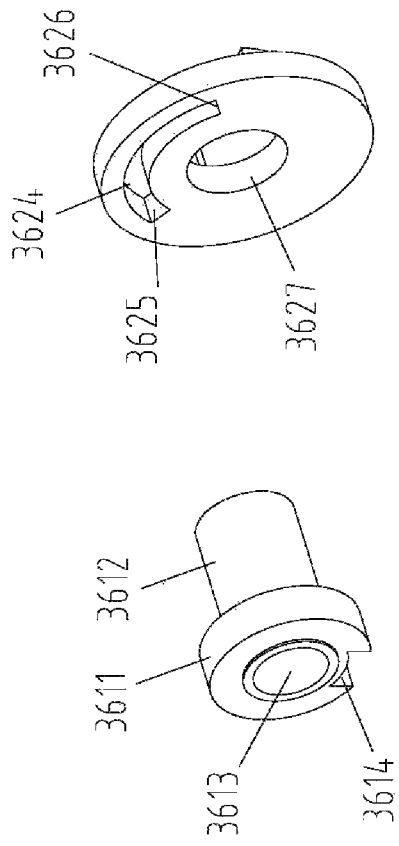
Fig. 14a  Fig. 14b  Fig. 13a  Fig. 13b  Fig. 12a  Fig. 12b

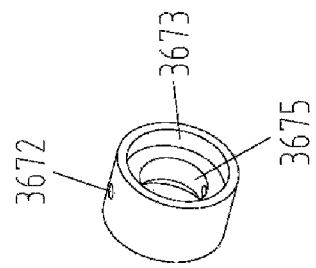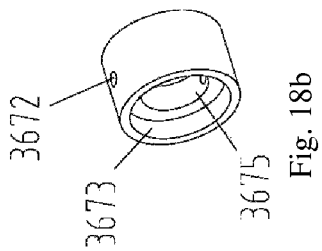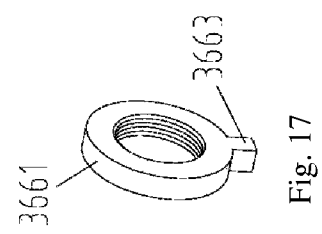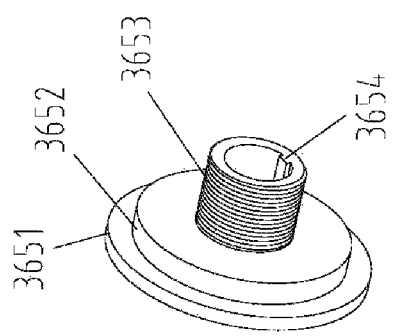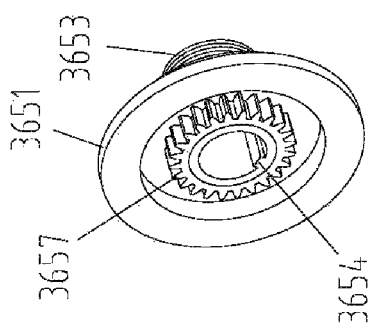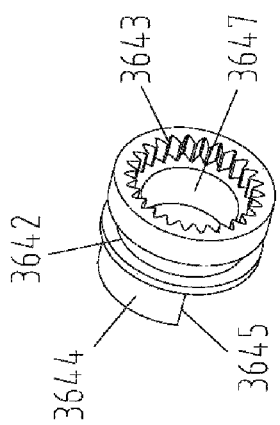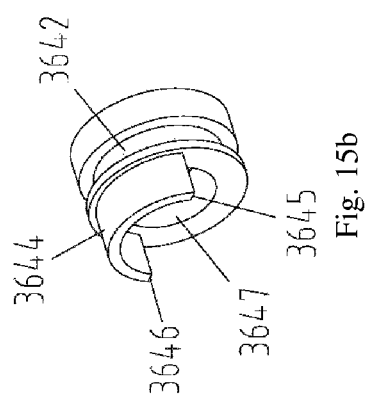

LOUVER ROLLER MECHANISM AND ROLLER SYSTEM WITH GEAR CLUTCH TURNING MECHANISM

FIELD OF THE INVENTION

The invention relates to a louver roller accessory, in particular to a louver roller mechanism and a roller system consisting of such a roller mechanism and a gear clutch turning mechanism.

BACKGROUND

A conventional louver consists of louver blades with arch-up cross sections, halyards, ladder tapes, a top rail and a base tail. A rotary actuator with self-locking function, a rotating shaft, several winding halyards and rollers for controlling the ladder tapes are installed in the top rail, the rotating shaft passes through the rotary actuator and the roller, there are ladder tapes between the top rail and the base rail, the lower ends of the ladder tapes are in fixed connection with the base rail, and two upper ends of the ladder tapes are butted and sheathed on the roller; a plurality of louver blades in parallel are put in the breast line of the ladder tape, a through hole is set at a symmetric center of the cross section of the louver blade to allow the halyard to pass through, the lower end of the halyard is in fixed connection with the base rail, and the upper end of the halyard is wound on the roller; the rotating shaft and the roller are driven to rotate by the rotary actuator, thus the louver blades can be lifted and turned; when the louver blades are folded, the halyards are wound to drive the base rail to rise, thus sequentially lifting up and folding the louver blades, and when the louver blades are unfolded, the halyards are unwound, and under the gravity of the base rail, the louver blades move down sequentially and are placed at an equal distance separated by the breast line of the ladder tape; when the base rail reaches the windowsill, the halyards are unwound completely, and when the rotary actuator continues to be pulled, the roller rotating together with the rotating shaft will turn the louver blades over under the action of frictional force, thus achieving the effect of adjusting indoor light. In practice, the roller for winding the halyards can also be replaced by a screw (see Utility Model ZL 02201583.3, Utility Model ZL 200420078400.6 and Patent Application No. 200480014523.6), and the roller which drives the ladder tapes to rotate by virtue of frictional force or bayonet can also be replaced by a torsion spring or a snap spring wheel (see Patent Application No. 200480014523.6).

One of critical defects of the conventional louver is that indoor daylight illumination could not be uniform. If the louver blades are turned and adjusted until the light near the window is moderate and glareless, the light deep into the interior is not enough, and it requires artificial lighting. If the louver blades are turned and adjusted until the light deep into the interior is moderate, the light near the window is glare. In addition, people only need moderate light, but no heat in summer, and people need both moderate light and heat in winter, however, for the purpose of reducing light and heat near the window, the louver blades of the conventional louver must be turned to the extent that the louver are almost closed whether in summer or in winter, which results in that the whole room is too dark, and appropriate indoor illumination should be maintained by artificial lighting whether in sunny day or cloudy day, thus causing enormous energy wastage and also reducing people's comfort and work efficiency. Therefore, in order to prevent glare and overheating near the window and give uniform daylight illumination deep into the interior, Chinese Patent Application (Application No. 201010162501.1 and Application No. 2010 1062 0508.3) discloses two combinatorial louver blades which can change space between louver blades, a combinatorial louver composed of such combinatorial louver blades would not change the path of light irradiating to the louver blades no matter whether the sun altitude H is greater or less than the shading angle of the louver, thus it can not only meet the requirement for preventing glare and overheating near the window, but also meet the requirement for uniform daylight illumination deep into the interior. Meanwhile, visual communication and air flow indoor and outdoor will not be affected. However, this patent application only disclosed the combinatorial structure of the combinatorial louver blades as well as shading and light guiding effects of relatively lifting and turning over the louver blade, and did not disclose a driving mechanism associated with such combinatorial louver. The invention discloses a roller system for the above-mentioned louver. This roller system is also applicable to a new scheme-a pitch-variable combinatorial louver with more than three secondary louver blades, which is extended from the above inventions (201010162501.1 and 2010 1062 0508.3).

The pitch D referred to in the invention is the distance between two adjacent primary louver blades, the width L of the louver blade is the horizontal width of the cross section of the louver blade, the pitch ratio D/L is the ratio of the pitch D to the width L of the louver blade, the pitch ratio D/L is the ratio of the louver pitch D to the width L of the louver blade, $D_1$ is the vertical distance of a first secondary louver blade relative to a lower primary louver blade of two adjacent primary louver blades, $D_2$ is the vertical distance of a second secondary louver blade relative to a lower primary louver blade of two adjacent primary louver blades, $D_3$ is the vertical distance of a third secondary louver blade relative to a lower primary louver blade of two adjacent primary louver blades, and $\phi$ is an angle that the louver blade is turned from a horizontal position to a closed position.

SUMMARY OF THE INVENTION

Because no driving mechanism of such combinatorial louver exists in the prior art, for accomplishing above actions of the louver blades, the invention discloses a roller mechanism for accomplishing above actions of the louver and a roller system consisting of such a roller mechanism and a gear clutch turning mechanism, which is mainly used for controlling rising of the secondary louver blades and turning of all louver blades.

In order to solve above technical problems, the invention solves by the following technical schemes:

The louver roller mechanism comprises a turning cylinder, at least one roller is mounted in the turning cylinder, a turning cylinder cover is mounted at the opening of the turning cylinder, the turning cylinder and the turning cylinder cover are sequentially and axially mounted on a rotating shaft, a square shaft is mounted in the rotating shaft, a secondary ladder tape is fixed on the roller and connected with secondary louver blades, the roller turns over to drive the secondary louver blades to rise and fall horizontally, and the turning cylinder drives the secondary louver blades to turn over. The roller mechanism drives the secondary louver blades to rise, and when all louver blades fall down to a windowsill position, the secondary louver blades and the primary louver blade are combined. The square shaft drives the rotating shaft to rotate, the rotating shaft drives the roller to rotate, and the roller rotates to wind ladder tapes which are connected with the secondary louver blade, thus allowing the secondary louver blades to rise.

Preferably, annular grooves are set on an outer ring surface of the turning cylinder, holes are respectively set on the top of the annular grooves and pin shafts are mounted on both sides of the holes, and a pin shaft is mounted on the top of the annular groove; the annular grooves are respectively wound with primary and secondary ladder tapes, upper ends of the front and rear cords of the secondary ladder tape pass through a hole between two pin shafts of the annular grooves, go into the turning cylinder and get fixed connection with the roller, and upper ends of the front and rear cords of the primary ladder tape are fixed on the pin shaft on the top of the annular groove and in fixed connection with the turning cylinder; breast lines of the primary and secondary ladder tapes run through the louver blades, sector steps are axially held out from an outer wall of a closed end surface of the turning cylinder along the cylinder wall, and a raised key is axially set on the side of an inner cylinder wall of the turning cylinder. A first secondary ladder tape, a second secondary ladder tape and a third secondary ladder tape pass through the turning cylinder and are wound on the annular grooves on the outer ring surface, then the ladder tapes are wound to pass through the pin shaft, and the ladder tapes are hung down and connected with the secondary louver blades. Holes on the top and pin shafts inserted into the pin holes are such that the frictional force between the cords of the ladder tapes and the turning cylinder is reduced after upper ends of the front and rear cords of the first secondary ladder tape, the second secondary ladder tape and the third secondary ladder tape go in. The sector steps are used for controlling the turning angle of the turning cylinder, and when the turning cylinder turns to a certain position, the sector steps touches and resists the base to stop it from rotating.

Preferably, a first secondary roller, a second secondary roller and a third secondary roller are axially mounted in the turning cylinder. The first secondary roller, the second secondary roller and the third secondary roller control rising and falling of a first secondary louver blade, a second secondary louver blade and a third secondary louver blade respectively, and when the first secondary roller rotates, the first secondary ladder tape connected therewith are wound, and the first secondary louver blade rises. When it rises to a predetermined position, the second secondary roller is driven to rotate, the second secondary ladder tape connected therewith is wound, and the second secondary louver blade rises. When it rises to a predetermined position, the third secondary roller is driven to rotate, the third secondary ladder tape connected therewith is wound, and the third secondary louver blade rises. When it rises to a predetermined position, the turning cylinder is driven to rotate, so as to achieve turning of all louver blades. Similarly, it is possible to add a fourth secondary roller or reduce a roller correspondingly, and the rollers to be controlled can be determined according to the number of ladder tapes.

Preferably, a raised key is set in an inner ring of the first secondary roller, and the raised key is matched with a slide way of the rotating shaft; a sector bulge is axially held out from one side of an annular disc, the sector bulge rotates on a concave platform of the second secondary roller, a sector bulge is set on the same side of the concave platform, a sector bulge and a concave platform are set on the other side of the second secondary roller, the concave platform is matched with an annular bulge of the third secondary roller, the rotating shaft drives the first secondary roller to rotate, the first secondary roller drives the second secondary roller to rotate, and the second secondary roller drives the third secondary roller to rotate; bulges which are set in the outer ring of the annular bulge of the third secondary roller and extend out of the outer ring are matched with the raised key on the inner wall of the turning cylinder. The rotating shaft is connected with the first secondary roller through the raised key and the slide way and the rotating shaft drives the first secondary roller to rotate, at this point, the sector bulge of the first secondary roller slides on the concave platform of the second secondary roller, and when the sector bulge slides to touch the sector bulge of the second secondary roller, the first secondary roller drives the second secondary roller to rotate together, the travel length that they could rotate between the sector bulge of the first secondary roller and the sector bulge of the second secondary roller is the travel length that the first secondary roller rotates individually, and this travel length is the distance that the first secondary blade rises individually. When the second secondary roller rotates, the second secondary blade and the first secondary blade rise, and similarly, when the third secondary roller rotates, the third secondary blade, the second secondary blade and the first secondary blade rise. When the third secondary roller rotates to a predetermined position, bulges which are set in the outer ring of the annular bulge of the third secondary roller and extend out of the outer ring are matched with the raised key on the inner wall of the turning cylinder, and are in integrative connected with the whole turning cylinder.

Preferably, there are annular grooves set in all outer rings of the first secondary roller, the second secondary roller and the third secondary roller, secondary ladder tapes are respectively embedded in the annular grooves, and pin shafts are respectively inserted into each pin hole for fixing upper ends of the front and rear cords of corresponding secondary ladder tape. The first secondary ladder tape, the second secondary ladder tape and the third secondary ladder tape are respectively wound on the annular grooves in outer rings of the first secondary roller, the second secondary roller and the third secondary roller, and the front and rear cords of the ladder tapes are respectively fixed in the pin holes in the annular grooves.

A roller system with a gear clutch turning mechanism comprises a base and a top cover. The roller mechanism described above and a gear clutch turning mechanism are set on the base, the roller mechanism is wound with ladder tapes, the roller mechanism is in axial connection with the gear clutch turning mechanism, and the roller mechanism and the gear clutch turning mechanism are driven to rotate by the square shaft; the roller rotates to wind the secondary ladder tape thereon to achieve horizontal rising and falling of various secondary louver blades, and when various secondary louver blades horizontally rise to a predetermined position, the gear clutch turning mechanism drives the turning cylinder to rotate along with the roller so as to achieve turning of all louver blades. The roller mechanism controls rising and falling of the secondary louver blades, and the roller within the roller mechanism rotates to wind the ladder tapes thereon and in turn to drive various secondary louver blades to rise and fall. When various secondary louver blades rise to a predetermined position, the roller drives the turning cylinder to rotate through the gear clutch turning mechanism, to achieve turning of all louver blades. The gear clutch is used to achieve locking and unlocking of the turning cylinder.

Preferably, the gear clutch turning mechanism comprises a turning disc, the turning disc is sheathed on a fixed sleeve, the other end of the fixed sleeve is matched with an outer wall of a closed end surface of the turning cylinder, the turning disc is matched with a torsion spring unlocking gear, a torsion spring is set between the turning disc and the torsion spring unlocking gear, the torsion spring is sheathed on the fixed sleeve and both its ends are respectively placed on a semi-annular wall of the turning disc, the torsion spring unlocking gear is in matched connection with a clutch gear, and a fixing nut is screwed on a hollow shaft on the other end of the clutch gear; the fixed sleeve, the turning disc, the torsion spring unlocking gear and the clutch gear are sequentially and axially mounted on the rotating shaft.

Preferably, there is an annular groove set in the outer ring of the turning disc and there is a pin hole in the annular groove, the primary ladder tape is fixed in the pin hole, and the primary ladder tape is wound on the annular groove; one side of the turning disc is planar, a semi-annular wall is axially set on the other side of the turning disc, an annular axial hole is also set on the turning disc, and the annular axial hole is matched with the sector step axially held out from the closed end surface of the turning cylinder along the cylinder wall.

Preferably, an annular groove is set outside of the torsion spring unlocking gear, the annular groove is stuck on a support of the base and restricted in its axial movement, an inner ring gear is set on an end surface of an inner ring of the torsion spring unlocking gear, the inner ring gear is meshed with the clutch gear, a semi-annular wall is axially held out from the other side of the torsion spring unlocking gear, and the axial length and radius of the semi-annular wall are equal to those of the semi-annular wall of the turning disc.

Preferably, a clutch gear is set on one side of an annular disc of the clutch gear, a hollow screw is set on the other side of the annular disc, an inner ring key is set in the hollow screw, a screw thread is set outside the hollow screw, the hollow screw is matched with the fixing nut, the fixing nut is fixed on the base, the hollow screw moves in the fixing nut axially, and when the hollow screw gets close to the torsion spring unlocking gear, the clutch gear is embedded in the inner ring gear of the torsion spring unlocking gear, the torsion spring unlocking gear is matched with the turning disc, and then the annular disc is jogged with the turning disc as a whole to rotate synchronously.

The turning disc of the above-mentioned gear clutch turning mechanism is sheathed on the fixed sleeve. The sector step axially held out from a closed end surface of the turning cylinder along the cylinder wall passes through the annular axial hole on the turning disc, locks the turning cylinder through the torsion spring and gets in integrative connection with the turning cylinder. The axial length and radius of the semi-annular wall of the torsion spring unlocking gear are equal to those of the semi-annular wall of the turning disc, and the two semi-annular wall form a circular cylinder with each other. In the initial state, the inner ring gear of the torsion spring unlocking gear is detached from the clutch gear. The hollow screw is matched with the fixing nut, and because the fixing nut is fixed on the base, when the rotating shaft drives the first secondary roller to rotate, the clutch gear is also driven to rotate. Due to constraint of the thread of the fixing nut during rotating, the clutch gear axially moves at the speed of one pitch per circle, and the initial axial distance between the clutch gear and the torsion spring unlocking gear is dependent on the pitch of the fixing nut and the maximum rising distance of the first secondary louver blade relative to the primary louver blade. When the third secondary roller rotates to the bulge in the outer ring of the third secondary roller and touches the raised key on the inner wall of the turning cylinder, the clutch gear also starts to be inserted into the torsion spring unlocking gear and is matched with it; when the rotating shaft continues rotating, the clutch gear is gradually inserted into the torsion spring unlocking gear and drives the torsion spring unlocking gear to rotate together; one side wall of the semi-annular wall of the torsion spring unlocking gear is pressed against one end of the torsion spring, to eliminate locking effect of the torsion spring on the turning cylinder and drive the turning cylinder to rotate to the side wall of the sector step bulge of the turning cylinder and touch the side wall of the bulge of the base, thus driving the primary and secondary louver blades to turn to the closed position.

After the secondary louver blade completes relative rising and turns to the closed position together with the louver blade along with the turning cylinder, the rotating shaft rotates reversely, and then the primary and secondary louver blades are withdrawn in the original order. First, the primary and secondary louver blades simultaneously turn to a horizontal position, during this process when the primary and secondary louver blades turn to the horizontal position, the clutch gear is withdrawn from the torsion spring unlocking gear gradually, but it still drives the torsion spring unlocking gear to rotate reversely, the side wall of the semi-annular wall of the torsion spring unlocking gear is pressed against one end of the torsion spring, to eliminate locking effect of the torsion spring on the turning disc and drive the turning cylinder to rotate reversely, while the turning cylinder is pressed against on the outer ring bulge of the second secondary roller and on the outer ring bulge of the third secondary roller through the raised key on its inner wall so as to drive the second secondary roller and the third secondary roller to rotate reversely, and the first secondary roller is driven to rotate reversely by the rotating shaft. Various ladder tapes are wound by the roller so as to drive the primary and secondary louver blades to turn reversely, and when the primary and secondary louver blades return to the initial horizontal position, the clutch gear is detached from the torsion spring unlocking gear. The turning disc and the turning cylinder are locked on the fixed sleeve by the torsion spring, the rotating shaft continues to rotate reversely, the first secondary roller rotates along with it, the interaction between the first secondary roller and the second secondary roller is eliminated, the interaction between the second secondary roller and the third secondary roller is eliminated, and under their own gravity of the base rail and the louver blades, various secondary louver blades fall down in the original order until they are superposed on the primary louver blade.

The roller system for the above-mentioned louver according to the technical schemes of the invention can control rising of the secondary louver blades and turning of all louver blades.

BRIEF DESCRIPTION OF DRAWINGS

FIG. 5 is a three-dimensional diagram of a turning cylinder cover of the roller mechanism of the roller system with three secondary louver blades.

FIG. 6 is a three-dimensional diagram of a third secondary roller of the roller mechanism of the roller system with three secondary louver blades.

FIG. 7 is a three-dimensional diagram of a second secondary roller of the roller mechanism of the roller system with three secondary louver blades.

FIG. 8 is a three-dimensional diagram of a first secondary roller of the roller mechanism of the roller system with three secondary louver blades.

FIG. 9 is a three-dimensional diagram of a turning cylinder of the roller mechanism of the roller system with three secondary louver blades.

FIG. 10 is a three-dimensional diagram of a rotating shaft of the roller mechanism of the roller system with three secondary louver blades.

FIG. 12 is a three-dimensional diagram of a fixed sleeve of the gear clutch turning mechanism of the roller system with three secondary louver blades.

FIG. 13 is a three-dimensional diagram of a turning disc of the gear clutch turning mechanism of the roller system with three secondary louver blades.

FIG. 14a is a three-dimensional diagram of a torsion spring of the gear clutch turning mechanism of the roller system with three secondary louver blades.

FIG. 14b is an axial view of a torsion spring of the gear clutch turning mechanism of the roller system with three secondary louver blades.

FIG. 15 is a three-dimensional diagram of a torsion spring unlocking gear of the gear clutch turning mechanism of the roller system with three secondary louver blades.

FIG. 16 is a three-dimensional diagram of a clutch gear of the gear clutch turning mechanism of the roller system with three secondary louver blades.

FIG. 17 is a three-dimensional diagram of a fixing nut of the gear clutch turning mechanism of the roller system with three secondary louver blades.

FIG. 18 is a three-dimensional diagram of a rotating shaft limiting sleeve of the gear clutch turning mechanism of the roller system with three secondary louver blades.

DETAILED DESCRIPTION OF PREFERRED EMBODIMENTS

Figure 1:
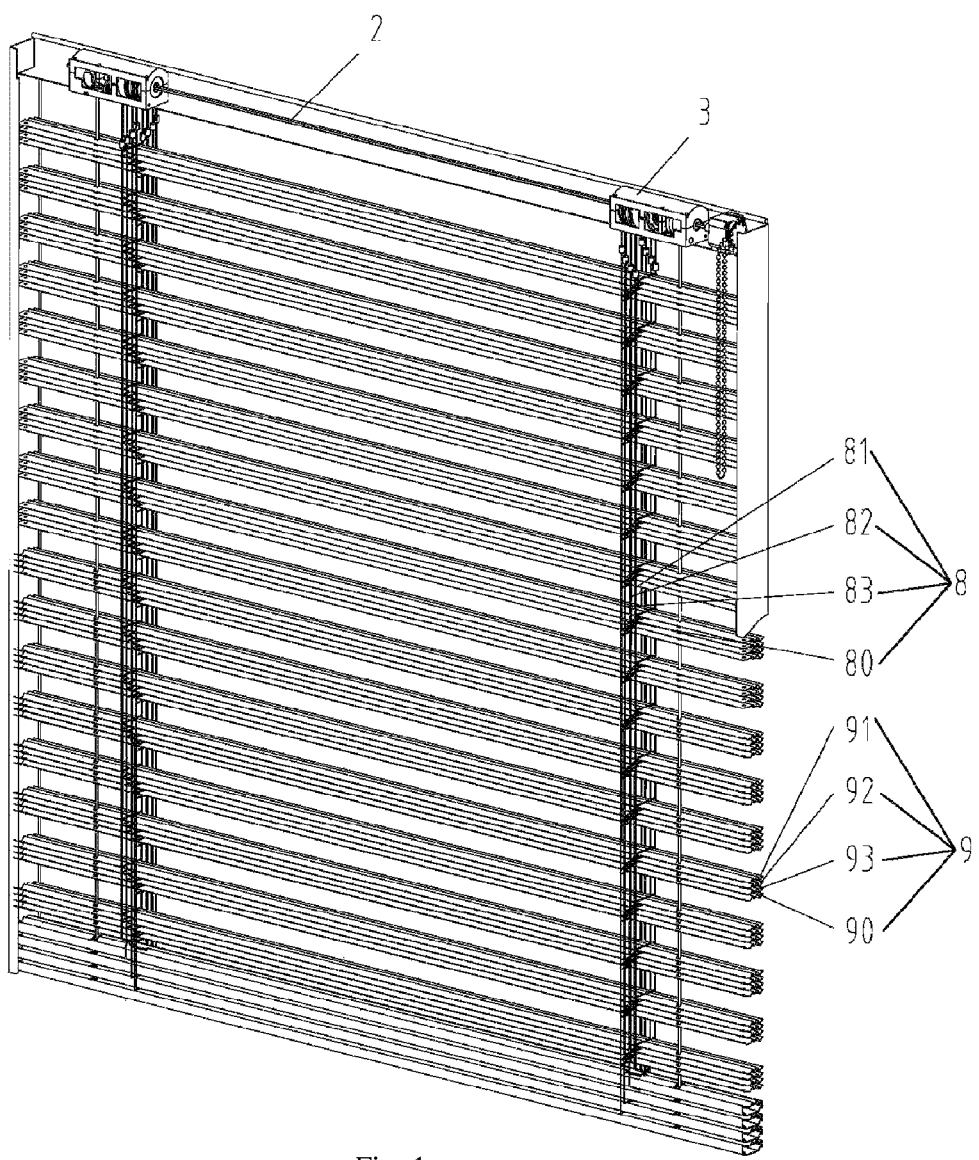
FIG. 1 is a three-dimensional diagram of a pitch-variable combinatorial louver with three secondary louver blades.
Figure 2:
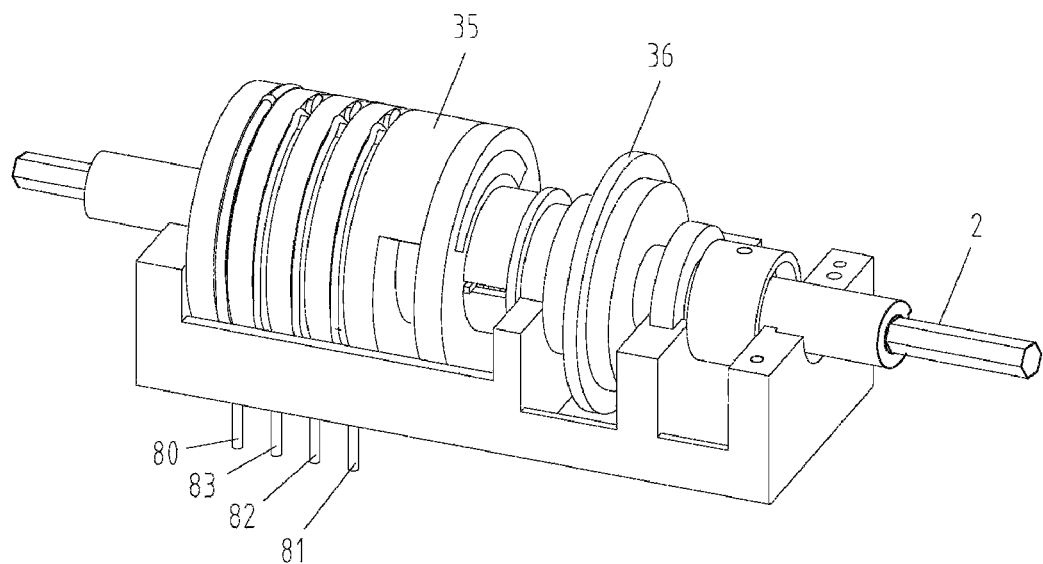
FIG. 2 is a three-dimensional diagram of a roller system 3 of the pitch-variable combinatorial louver with three secondary louver blades.
Figure 3:
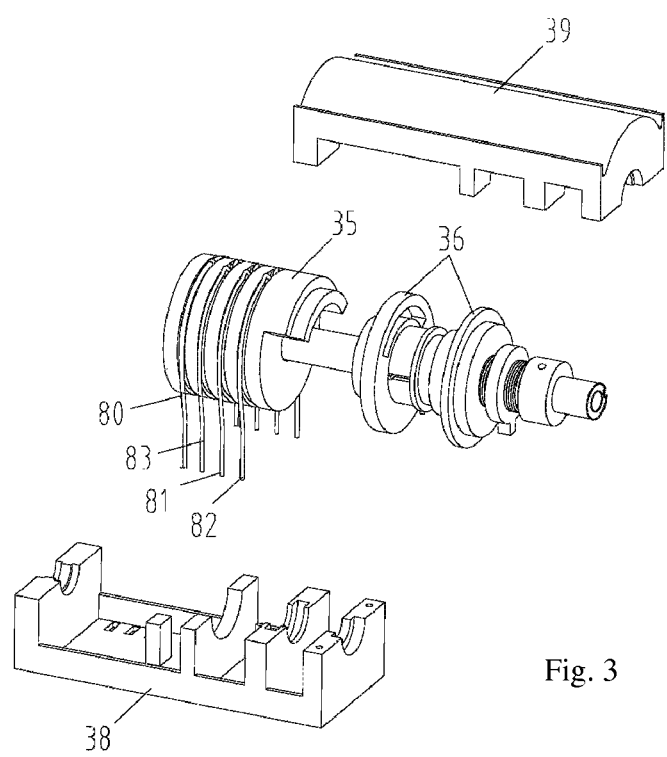
FIG. 3 is a three-dimensional explosive diagram of a roller system 3 of the pitch-variable combinatorial louver with three secondary louver blades.

The invention will be further described in detail in conjunction with the drawings and specific embodiments, below:

The roller system for the louver according to FIGS. 2 and 3 comprises a roller mechanism 35 and a gear clutch turning mechanism 36. The roller mechanism 35 comprises a first secondary roller 351, a second secondary roller 352, a third secondary roller 353, a turning cylinder 354, a turning cylinder cover 355 and a rotating shaft 356; the first secondary roller 351, the second secondary roller 352 and the third secondary roller 353 are mounted in the turning cylinder 354, the turning cylinder cover 355 is embedded in one end of the turning cylinder 354, and the other end of the turning cylinder 354 is a closed end surface with an inner ring; the rotating shaft 356 passes through the inner ring in the closed end surface of the turning cylinder 354, the first secondary roller 351, the second secondary roller 352, the third secondary roller 353 and the turning cylinder cover 355; the gear clutch turning mechanism 36 comprises a fixed sleeve 361, a turning disc 362, a torsion spring 363, a torsion spring unlocking gear 364, a clutch gear 365, a fixing nut 366 and a limiting sleeve 367 which are sequentially and axially sheathed on the rotating shaft 356 in an axial connection.

Figure 4:
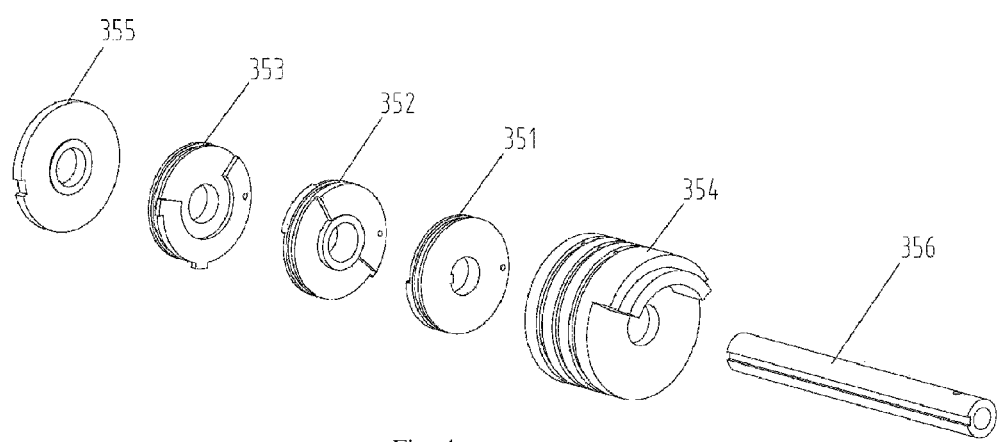
FIG. 4 is a three-dimensional explosive diagram of a roller mechanism of the roller system with three secondary louver blades.

FIG. 4 is a three-dimensional explosive diagram of a roller mechanism 35. The roller mechanism 35 comprises a first secondary roller 351, a second secondary roller 352, a third secondary roller 353, a turning cylinder 354, a turning cylinder cover 355 and a rotating shaft 356.

FIG. 5 is a three-dimensional diagram of a turning cylinder cover 355 of the roller mechanism 35. There is an inner ring 3553 on the turning cylinder cover 355, a notch 3552 is set in an outer ring of the turning cylinder 355, both sides of the turning cylinder 355 are planar, and an annular convex platform 3554 and 3555 is set on each side.

FIG. 6 is a three-dimensional diagram of the third secondary roller 353 of the roller mechanism 35. There is an inner ring 3533 on the third secondary roller 353, and an annular groove 3532 is set on the outer ring surface of the third secondary roller 353. One side of the third secondary roller 353 is planar, and an annular bulge 3534 is axially held out from the other side of the third secondary roller 353. The annular bulge 3534 is set with an inner ring 35290, and the annular bulge 3534 is also set with a pin hole 3539 for fixing upper ends of the front and rear cords 829 and 829 of the third secondary ladder tape; the annular bulge 3534 has an end surface 3535 and the other end surface 3536, two bulges 3537 and 3538 which extend out of the outer ring are set in the outer ring of the annular bulge 3534, the outer ring bulge 3537 is located on an end wall 3535 of the annular bulge 3534, and the outer ring bulge 3538 is located between two end walls 3535 and 3536 of the annular bulge 3534.

FIG. 7 is a three-dimensional diagram of the second secondary roller 352 of the roller mechanism 35. There is an inner ring 3523 on the second secondary roller 352, and an annular groove 3522 and a bulge 35213 extending out of the outer ring are set in the outer ring of the second secondary roller 352. A sector bulge 3524 and a concave platform 3528, as well as a sector bulge 3529 and a concave platform 35212 are axially held out from both sides of the second secondary roller 352 respectively, and there is a pin hole 3527 for fixing upper ends of the front and rear cords 821 and 822 of the second secondary ladder tape.

FIG. 8 is a three-dimensional diagram of the first secondary roller 351 of the roller mechanism 35. There is an inner ring 3513 on the first secondary roller 351, and an annular groove 3512 is set in the outer ring of the first secondary roller 351. There is a lateral pin hole 3516 on the first secondary roller 351, for fixing upper ends of the front and rear cords 811 and 812 of the first secondary ladder tape. A raised key is set in the inner ring of the first secondary roller 351, one side of the first secondary roller 351 is planar, and a sector bulge 3517 is axially held out from the other side of the first secondary roller 351.

FIG. 9 is a three-dimensional diagram of the turning cylinder 354 of the roller mechanism 35. The turning cylinder 354 is a circular cylinder, annular grooves 3541, 3542, 3543 and 3544 are set on its outer ring surface, for embedding the first secondary ladder tape 81, the second secondary ladder tape 82, the third secondary ladder tape 83 and the primary ladder tape 80, and there is a hole 3545 on the top of each of the annular grooves 3541, 3542 and 3543 and a pin shaft 3546 is mounted on both sides of the hole, such that the frictional force between the cords of the ladder tapes and the turning cylinder 354 is reduced after upper ends of the front and rear cords of the first secondary ladder tape 81, the second secondary ladder tape 82 and the third secondary ladder tape 83 go in. A pin shaft 35414 is mounted on the top of the annular groove 3544, to fix upper ends of the front and rear cords of the primary ladder tape 80 on the top of the turning cylinder. An inner ring 3548 is set on the outer wall of the closed end surface of the turning cylinder 354 and a sector step 3547 and 3549 is held out from along the cylinder wall, the inner wall of the closed end surface of the turning cylinder 354 is planar, and an annular convex platform 35413 is set on it. A raised key 35412 is set on the inner wall of the turning cylinder 354, and two pin holes 35415 are drilled on the top of the open end of the turning cylinder 354, so as to insert the pin shaft 3546.

FIG. 10 is a three-dimensional diagram of the rotating shaft 356 of the roller mechanism 35. The rotating shaft 356 is a hollow circular shaft, a slide way 3562 is set on the rotating shaft 356 and a pin hole 3564 is set on one end of the rotating shaft 356.

Figure 11:
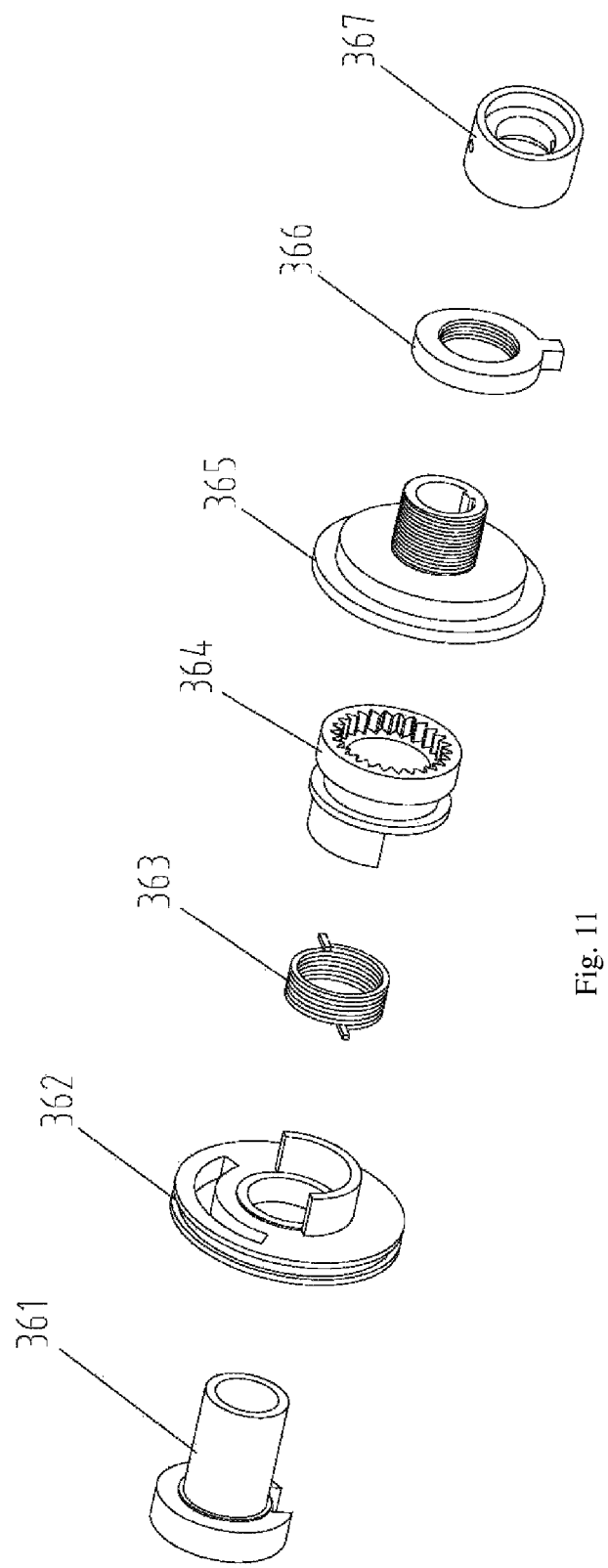
FIG. 11 is a three-dimensional explosive diagram of a gear clutch turning mechanism of the roller system with three secondary louver blades.

FIG. 11 is a three-dimensional explosive diagram of the gear clutch turning mechanism 36. The gear clutch turning mechanism 36 comprises a fixed sleeve 361, a turning disc 362, a torsion spring 363, a torsion spring unlocking gear 364, a clutch gear 365, a fixing nut 366 and a limiting sleeve 367.

FIG. 12 is a three-dimensional diagram of the fixed sleeve 361 of the gear clutch turning mechanism 36. The fixed sleeve 361 is formed by combing a hollow shaft 3612 and an annular disc 3611 as a whole, and there is a notch in the outer ring of the annular disc 3611.

FIG. 13 is a three-dimensional diagram of the turning disc 362 of the gear clutch turning mechanism 36. There is an inner ring 3627 on the turning disc 362, one side of the turning disc 362 is planar, a semi-annular wall 3628 which is located at the lower half of the annular disc 3621 is axially held out from the other side of the turning disc 362, and an annular axial hole 3624 which is located at the upper half of the turning disc 362 is set between the inner ring and the outer ring of the turning disc 362.

FIG. 14a is a three-dimensional diagram of the torsion spring 363 of the gear clutch turning mechanism 36, and FIG. 14b is an axial view of the torsion spring 363 of the gear clutch turning mechanism 36. Angle between both ends 3631 and 3632 of the torsion spring 363 is θ, and generally this angle is 180°.

FIG. 15 is a three-dimensional diagram of the torsion spring unlocking gear 364 of the gear clutch turning mechanism 36. An inner ring 3647 is set on the annular disc of the torsion spring unlocking gear 364, an annular groove 3642 is set in the outer ring of the torsion spring unlocking gear 364, an inner ring teeth 3643 is set on one side of the inner ring of the torsion spring unlocking gear 364, a semi-annular wall 3644 is axially held out from the other side of the torsion spring unlocking gear 364, and the axial length and radius of the semi-annular wall 3644 are equal to those of the semi-annular wall 3628 of the turning disc 362.

FIG. 16 is a three-dimensional diagram of the clutch gear 365 of the gear clutch turning mechanism 36. The clutch gear 365 comprises an annular disc 3651, an annular step 3652 is set on the annular disc 3651, a hollow screw 3653 is set on one end of the annular disc 3651, an inner ring key 3654 is set within the hollow screw 3653, and a clutch gear 3657 is set on the other end of the annular disc 3651.

FIG. 17 is a three-dimensional diagram of the fixing nut 366 of the gear clutch turning mechanism 36. The fixing nut 366 is a nut 3661 with a bulge 3663.

FIG. 18 is a three-dimensional diagram of the limiting sleeve 367 of the gear clutch turning mechanism 36. A perforative pin hole 3672 is radially set in the outer ring of an annular sleeve 3671 of the limiting sleeve 367, and an inner ring step 3673 is axially set on each side of the inner ring 3675 of the annular sleeve 3671.

FIG. 4 shows the assembly relationship of various part of the roller mechanism 35. The rotating shaft 356 is sequentially pulled through the turning cylinder 354, the first secondary roller 351, the second secondary roller 351, the third secondary roller 351 and the turning cylinder cover 355, to embed the raised key 3514 in the inner ring of the first secondary roller 352 into the slide way 3562 of the rotating shaft 356, meanwhile the sector bulge 3517 of the first secondary roller 351 is jogged with the sector bulge 3524 of the second secondary roller 352, the sector bulge 3529 of the second secondary roller 352 is jogged with the annular bulge 3534 of the third secondary roller 353, and finally the outer ring notch of the turning cylinder cover 355 is jogged with the raised key on the inner wall of the turning cylinder 354, thus mounting various roller into the turning cylinder 354 to assemble the roller mechanism 35.

FIG. 11 shows the assembly relationship of the gear clutch turning mechanism 36. The fixed sleeve 361 is inserted from the left of the turning disc 362 into the inner ring 3627 of the turning disc 362, then the torsion spring 363 is sheathed from the right of the turning disc 362 on the hollow shaft 3612 of the fixed sleeve 361, one end 3629 of the torsion spring 363 is laid on one end wall 3629 of the semi-annular wall 3628 of the turning disc 362, and the other end 3629 of the torsion spring 363 is laid on the other end wall 36210 of the semi-annular wall 3628 of the turning disc 362, thus assembling a torsion spring locking device. The hollow screw 3653 of the clutch gear 365 is screwed into the fixing nut 366, then assembly parts such as the torsion spring locking device, the torsion spring unlocking gear 363, the clutch gear 365 and the fixing nut 366 and the limiting sleeve 367 are sequentially sheathed on the rotating shaft 356 from the right of the rotating shaft 356 and are fixed together by pulling the pin into the pin hole 3672 of the limiting sleeve 367 and the pin hole 3564 of the rotating shaft 356, meanwhile the annular through hole 3624 of the turning disc 362 is sheathed on the sector step 3549 of the turning cylinder 354.

Figures 19, 20:
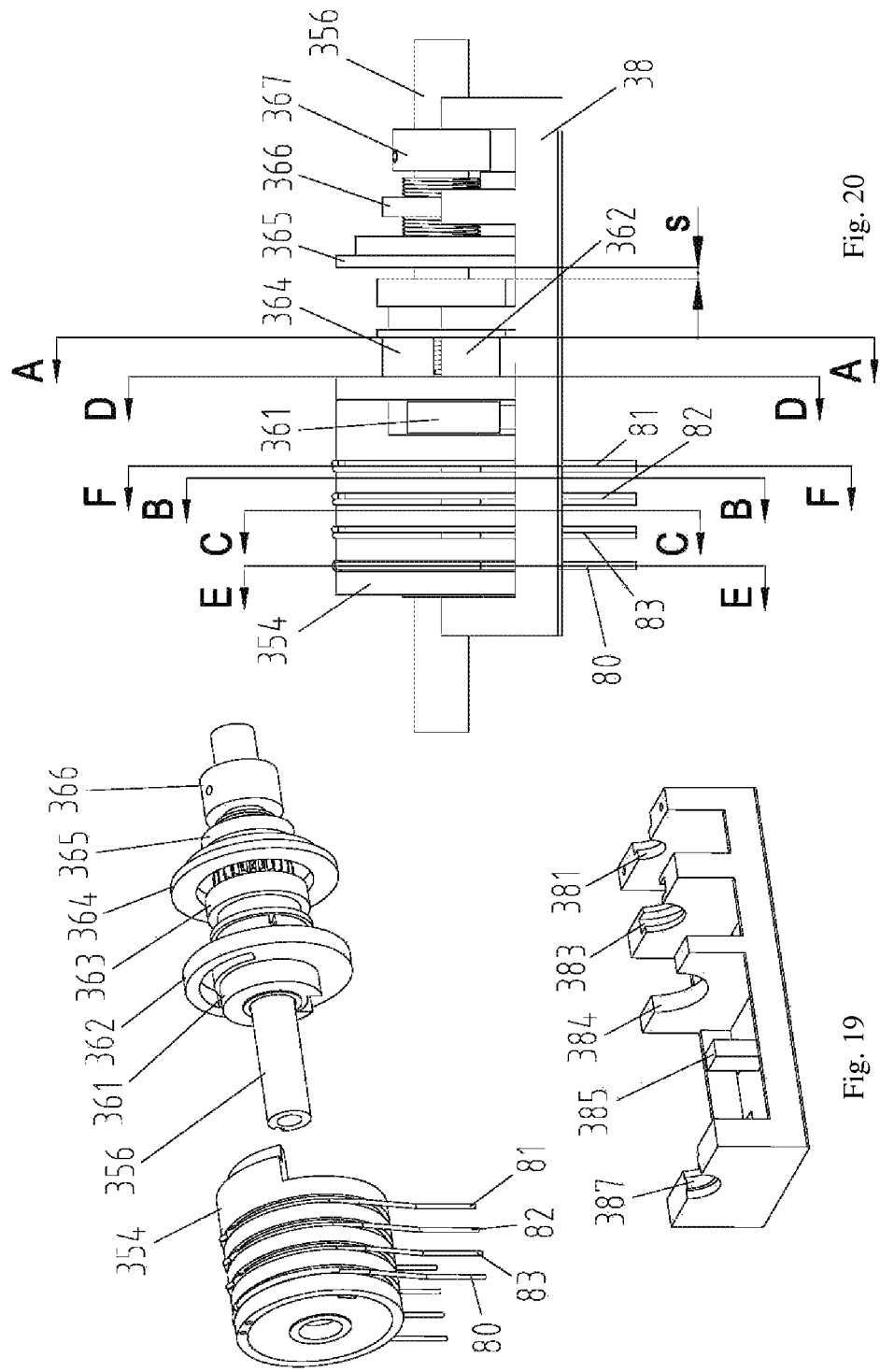
FIG. 19 is a three-dimensional explosive diagram of the roller system with three secondary louver blades.
FIG. 20 is the front view and the schematic diagram of profile positions of the roller system with three secondary louver blades.

FIG. 19 shows the assembly relationship between the roller mechanism 35 and the gear clutch turning mechanism 36 of the roller system 3. One end of the rotating shaft 356 of the roller mechanism 35 is placed on a support 381 of the base 38, and the other end is placed on a support 387. The notch 3616 of the annular disc 3611 of the fixed sleeve 361 of the gear clutch turning mechanism 36 is jogged with the bulge 385 of the base 38, thus making the fixed sleeve 361 unable to rotate. The annular groove 3642 of the torsion spring unlocking gear 363 of the gear clutch turning mechanism 36 is stuck on the support 384 of the base 38 and restricted in its axial movement, the fixing nut 365 of the gear clutch turning mechanism 36 is embedded into the support 383 of the annular groove of the base 38 and its outer ring bulge 3663 is inserted into the notch on the support 383 of the annular groove, thus making fixing nut 365 fixed on the base 38. The limiting sleeve 366 of the gear clutch turning mechanism 36 is stuck between the supports 381 and 383 of the base 38 to restrict the axial movement of the rotating shaft 356.

Figure 21:
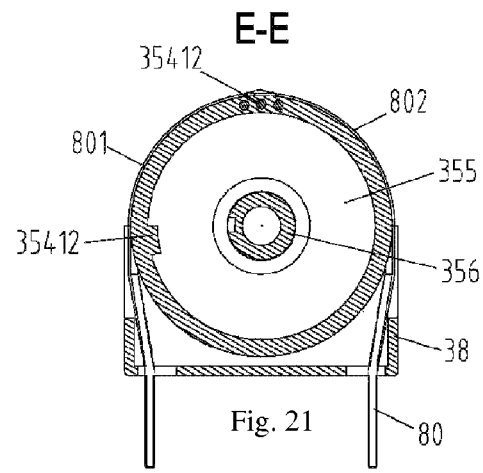
FIG. 21 is an E-E sectional view of the connection type of the primary ladder tapes of the roller system with three secondary louver blades.

FIG. 20 is the front view of the roller system 3. FIG. 21 is the E-E sectional view of FIG. 20, and this figure shows the connection type of the front and rear cords 801 and 802 of the primary ladder tape with the roller mechanism 35, wherein upper ends of the front and rear cords 801 and 802 are wound on the turning cylinder 354 and embedded into the annular groove 3544, and then fixed on the top of the annular groove 3544 of the turning cylinder 354 by the pin shaft 35414.

Figure 22:
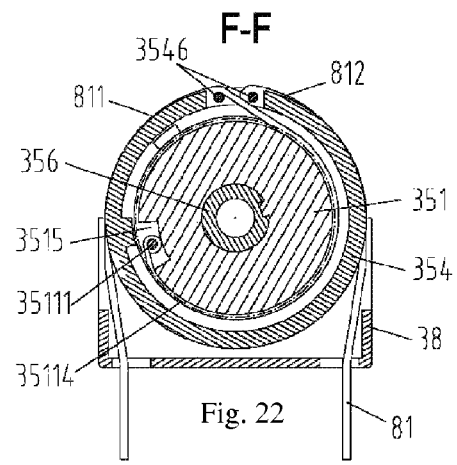
FIG. 22 is an F-F sectional view of the connection type of the secondary ladder tapes of the roller system with three secondary louver blades.

FIG. 22 is the F-F sectional view of FIG. 20, and this figure shows the connection type of the front and rear cords 811 and 812 of the primary ladder tape with the roller mechanism 35, wherein upper ends of the front and rear cords 811 and 812 are wound on the turning cylinder 354 and embedded into the annular groove 3541, then pulled through a hole 3545 between two pin shafts 3546 on the top of the turning cylinder 354, wound on the annular groove 3512 of the first secondary roller 351 and fixed on the first secondary roller 351 by the pin shaft 35111; the connection type between the front and rear cords 821 and 822 of the second secondary ladder tape 82 and the front and rear cords 829 and 829 of the third secondary ladder tape 83 and the roller mechanism 35 is in the same way.

A movement cycle of relative lifting and turning of louver blades of a pitch-variable combinatorial louver with three secondary louver blades is as follows: (1) the primary louver blade 90 is spread over the louver at an equal space, and the secondary louver blades 91, 92 and 93 are superposed on the primary louver blade 90 (corresponding to FIG. 29a); (2) the first secondary louver blade 91 rises to the position $D_1$-$D_2$ relative to the primary louver blade 90, and the second secondary louver blade 92 and the third secondary louver blade 93 are still superposed on the primary louver blade 90 (corresponding to FIG. 29b); (3) the first secondary louver blade 91 continues to rise to the position $D_2$ relative to the primary louver blade 90, meanwhile the second secondary louver blade 92 rises to the position $D_2$-$D_3$ relative to the primary louver blade 90, and the third secondary louver blade 93 is still superposed on the primary louver blade 90 (corresponding to FIG. 29c); (4) the first secondary louver blade 91 continues to rise to the position $D_1$ relative to the primary louver blade 90, meanwhile the second secondary louver blade 92 rises to the position $D_2$ relative to the primary louver blade 90, and the third secondary louver blade 93 rises to the position $D_3$ relative to the primary louver blade 90 (corresponding to FIG. 29d); (5) the primary and secondary louver blades 90, 91, 92 and 93 simultaneously rotate φ to close the louver (corresponding to FIG. 29e); (6) the primary and secondary louver blades 90, 91, 92 and 93 simultaneously turn back φ to the initial horizontal position (corresponding to FIG. 29d); (7) the secondary louver blades 91, 92 and 93 falls a distance $D_3$ relative to the primary louver blade 90 until the third secondary louver blade 93 is superposed on the primary louver blade 90 (corresponding to FIG. 29c); (8) the secondary louver blades 91 and 92 fall a distance $D_2$-$D_3$ relative to the primary louver blade 90 until the second secondary louver blade 92 is superposed on the primary louver blade 90 (corresponding to FIG. 29b); and (9) the secondary louver blade 91 fall a distance $D_1$-$D_2$ relative to the primary louver blade 90 until the first secondary louver blade 91 is superposed on the second secondary louver blade 92 (corresponding to FIG. 29a). Here, the pitch ratio D/L is set to be 1.6, and all $D_1$-$D_2$, $D_2$-$D_3$ and $D_3$ are set to be D/4.

Figure 23:
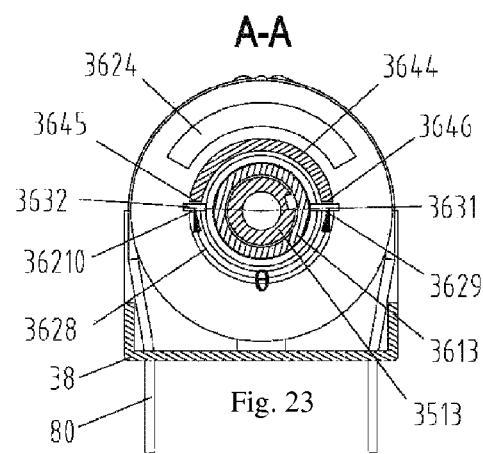
FIG. 23 is an A-A sectional view of the roller system with three secondary louver blades.

FIG. 23 is the A-A sectional view of FIG. 20. The semi-annular wall 3644 of the torsion spring unlocking gear 364 forms an intact annular wall with the semi-annular wall 3628 of the turning disc 362 and forms an annular cavity with the fixed sleeve 361. The torsion spring 363 is sheathed on the hollow shaft 3612 of the fixed sleeve 361 and located in the annular cavity, one end 3631 of the torsion spring 363 is laid on one end wall 3629 of the semi-annular wall 3628 of the turning disc 362, and the above is the end wall 3646 of the semi-annular wall 3644 of the torsion spring unlocking gear 364; and the other end 3632 of the torsion spring 363 is laid on the other end wall 36210 of the semi-annular wall 3628 of the turning disc 362, and the above is the end wall 3645 of the semi-annular wall 3644 of the torsion spring unlocking gear 364. When the torsion spring unlocking gear 364 rotates clockwise, the end wall 3646 on its one side is pressed against one end 3631 of the torsion spring 363, in turn to eliminate locking effect of the torsion spring 363 on the turning disc 362 and push the turning disc 362 and the turning cylinder 354 to rotate in the same direction. When the torsion spring unlocking gear 364 rotates anti-clockwise, the end wall 3645 on its other side is pressed against the other end 3632 of the torsion spring 363, in turn to eliminate locking effect of the torsion spring 363 on the turning disc 362 and push the turning disc 362 and the turning cylinder 354 to rotate in the same direction.

Figure 24:
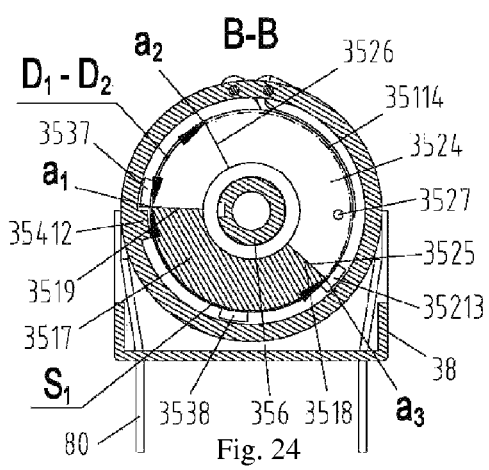
FIG. 24 is a B-B sectional view of the roller system with three secondary louver blades.
Figure 25:
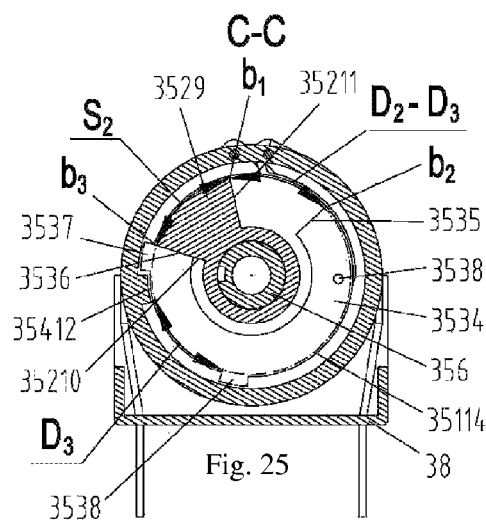
FIG. 25 is a C-C sectional view of the roller system with three secondary louver blades.
Figure 26:
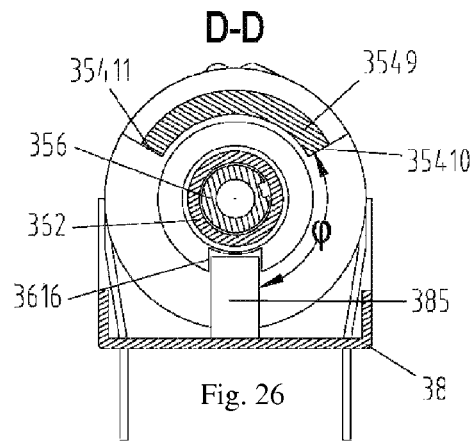
FIG. 26 is a D-D sectional view of the roller system with three secondary louver blades.
Figure 29A:
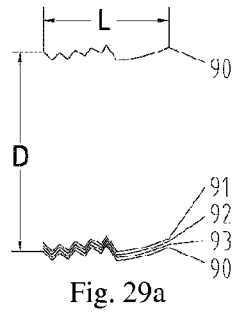
FIG. 29 is a cross-section schematic diagram of a combinatorial louver blade—a unit of a pitch-variable combinatorial louver which has three secondary louver blades and of which the primary and secondary louver blades turn over together.
Figure 29B:
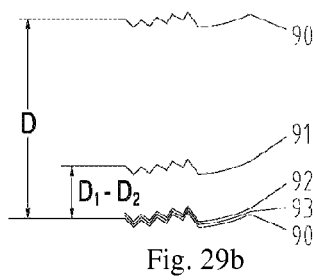
Figure 29C:
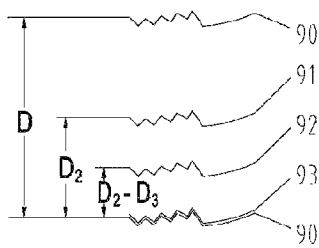
Figure 29D:
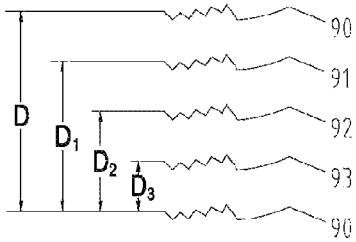
Figure 29E:
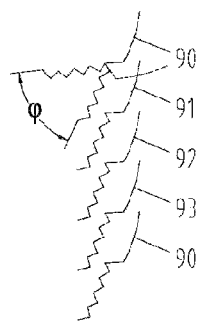

FIG. 23 is the B-B sectional view of the initial position of interaction between the torsion spring unlocking gear 364 and the turning disc 362 of the roller system 3 (corresponding to FIG. 29a), FIG. 24 is the B-B sectional view of the initial position of interaction between the first secondary roller 351 and the second secondary roller 352 of the roller system 3 (corresponding to FIG. 29a), FIG. 25 is the C-C sectional view of the initial position of interaction between the second secondary roller 352 and the third secondary roller 353 of the roller system 3 (corresponding to FIG. 29a), and FIG. 26 is the D-D sectional view of the initial position of interaction between the turning cylinder 354 and the base 38 of the roller system 3 (corresponding to FIG. 29a); when the blade group 9 is located at the initial position as shown in FIG. 29a, the side wall 3519 of the sector bulge 3517 of the first secondary roller 351 is close to the side wall 3526 of the sector bulge 3524 of the second secondary roller 352 (see FIG. 24), the side wall 35211 of the sector bulge 3529 of the second secondary roller 352 is close to the side wall 3535 of the sector bulge 3534 of the third secondary roller 353 (see FIG. 25), the outer ring bulge 3537 of the third secondary roller 353 is close to the raised key 35412 in the inner ring of the turning cylinder 354 (see FIG. 25), and the side wall 35410 of the sector step bulge 3549 of the turning cylinder 354 is close to one side wall of the bulge 385 of the base 38 with an angle φ (see FIG. 26); when the rotating shaft 356 drive the first secondary roller 351 to rotate to the position where the side wall 3518 of the sector bulge 3517 of the first secondary roller 351 starts to touch the side wall 3525 of the sector bulge 3524 of the second secondary roller 352 (as shown in FIG. 24), the front and rear cords 811 and 812 of the first secondary ladder tape 81 of the first secondary louver blade 91 are wound by the first secondary roller 351, making the first secondary louver blade 91 leave from the position where it is superposed on the second secondary louver blade 92 and horizontally rise an altitude $D_1$-$D_2$ relative to the primary louver blade 90, at this point, both the second secondary roller 352 and the third secondary roller 353 keep still, but the turning cylinder 354 with the turning disc 362 is locked on the fixed sleeve 361 by the torsion spring 363; when the sector bulge 3517 of the first secondary roller 351 continues to rotate after its side wall 3518 is touched with the side wall 3525 of the sector bulge 3524 of the second secondary roller 352, and the side wall 3518 of the sector bulge 3517 of the first secondary roller 351 is pressed against the side wall 3525 of the sector bulge 3524 of the second secondary roller 352 and pushes the second secondary roller 352 to rotate to the position where the side wall 35210 of the sector bulge 3529 of the second secondary roller 352 is touched with the side wall 3536 of the sector bulge 3534 of the third secondary roller 353 (as shown in FIG. 25), the outer ring bulge 35213 of the second secondary roller 352 is superposed with the position of the outer ring bulge 3538 of the third secondary roller 353, the front and rear cords 811 and 812 of the first secondary ladder tape 81 of the first secondary louver blade 91 are wound by the first secondary roller 351, and the front and rear cords 821 and 822 of the second secondary ladder tape 82 of the second secondary louver blade 92 are wound by the second secondary roller 352, making the second secondary louver blade 92 leave from the position superposed with the third secondary louver blade 93 and horizontally rise an altitude $D_2$-$D_3$ together with the first secondary louver blade 91 relative to the primary louver blade 90, and meanwhile the third secondary roller 353 keeps still; when the side wall 3518 of the sector bulge 3517 of the first secondary roller 351 is pressed against the side wall 3525 of the sector bulge 3524 of the second secondary roller 352 and pushes the second secondary roller 352 to rotate, and the side wall 35210 of the sector bulge 3529 of the second secondary roller 352 is pressed against the side wall 3536 of the sector bulge 3534 of the third secondary roller 353 and pushes the third secondary roller 353 to rotate until the outer ring bulge 3538 of the third secondary roller 353 is touched with the raised key 35412 on the inner wall of the turning cylinder (as shown in FIG. 25), the outer ring bulge 35213 of the second secondary roller 352 is touched with the raised key 35412 on the inner wall of the turning cylinder together with the outer ring bulge 3538 of the third secondary roller 353, the front and rear cords 811 and 812 of the first secondary ladder tape 81 of the first secondary louver blade 91 are wound by the first secondary roller 351, the front and rear cords 821 and 822 of the second secondary ladder tape 82 of the second secondary louver blade 92 are wound by the second secondary roller 352, and the front and rear cords 829 and 829 of the third secondary ladder tape 83 of the third secondary louver blade 93 are wound by the third secondary roller 353, making the third secondary louver blade 93 leave from the position superposed with the primary louver blade 90 and horizontally rise an altitude $D_3$ together with the first secondary louver blade 91 and the second secondary louver blade 92 relative to the primary louver blade 90; the rotating shaft 356 also drives the clutch gear 365 to rotate while driving the first secondary roller 351 to rotate, due to constraint of the thread of the fixing nut 366 during rotating, the clutch gear 365 axially moves at the speed of one pitch per circle, and the initial axial distance between the clutch gear 365 and the torsion spring unlocking gear 364 (as shown in FIG. 20) is the angle that the roller 351 is required to rotate and the magnitude of which is dependent on the pitch of the fixing nut 366 and the maximum rising distance $D_1$ of the first secondary louver blade 91 relative to the primary louver blade 90; when the third secondary roller 353 rotates until the outer ring bulge 3537 of the third secondary roller 353 is touched with the raised key 35412 on the inner wall of the turning cylinder (as shown in FIG. 25), the clutch gear 365 also starts to be inserted into and meshed with the torsion spring unlocking gear 364 (as shown in FIG. 23), and when the rotating shaft 356 continues to rotate, the clutch gear 365 is gradually inserted into the torsion spring unlocking gear 364 and drives the torsion spring unlocking gear 364 to rotate together; one side wall 3646 of the semi-annular wall 3644 of the torsion spring unlocking gear 364 is pressed against one end 3629 of the torsion spring 363, to eliminate locking effect of the torsion spring 363 on the turning cylinder 354 and drive the turning cylinder 354 to rotate φ until the side wall 35410 of the sector step bulge 3549 of the turning cylinder is touched with the side wall of the bulge 385 of the base 38 (as shown in FIG. 26), so as to drive the primary and secondary louver blades 9 to turn to a closed position (as shown in FIG. 29e); after the secondary louver blades 91, 92 and 93 completes relative rising and turns to the closed position together with the primary louver blade 90 along with the turning cylinder 354, the rotating shaft 356 rotates reversely, and then the primary and secondary louver blades 9 are withdrawn in the original order; first, the primary and secondary louver blades 9 simultaneously turn to a horizontal position as shown in FIG. 29d, during this process when the primary and secondary louver blades 9 turn to the horizontal position, the clutch gear 365 is withdrawn from the torsion spring unlocking gear 364 gradually, but it still drives the torsion spring unlocking gear 364 to rotate reversely, the side wall 3645 of the semi-annular wall 3644 of the torsion spring unlocking gear 364 is pressed against one end 3532 of the torsion spring 363, to eliminate locking effect of the torsion spring 363 on the turning disc 362 and drive the turning cylinder 354 to rotate reversely, while the turning cylinder 354 is pressed against on the outer ring bulge 35213 of the second secondary roller 352 and on the outer ring bulge 3538 of the third secondary roller 353 through the raised key on its inner wall so as to drive the second secondary roller 352 and the third secondary roller 353 to rotate reversely, and the first secondary roller 351 is driven to rotate reversely by the rotating shaft 356; various ladder tapes are wound by the roller so as to drive the primary and secondary louver blades 9 to turn reversely, and when the primary and secondary louver blades 9 return to the initial horizontal position (as shown in FIG. 29d), the clutch gear 365 is detached from the torsion spring unlocking gear 364, the turning disc 362 and the turning cylinder 354 are locked on the fixed sleeve 361 by the torsion spring 363, the rotating shaft 356 continues to rotate reversely, the first secondary roller 351 rotates along with it, the interaction between the first secondary roller 351 and the second secondary roller 352 is eliminated, the interaction between the second secondary roller 352 and the third secondary roller 353 is eliminated, and under their own gravity of the base rail 10 and the louver blades 9, various secondary louver blades 9 fall down in the original order until they are superposed on the primary louver blade 90.

The internal relationship of the roller mechanism 35 is dependent on the relative lifting altitudes $D_1$, $D_2$ and $D_3$ of the primary and secondary louver blades 9 and turning closed angle $\phi$. FIG. 24 is the B-B sectional view of FIG. 20. The sector bulge 3517 of the first secondary roller 351 and the sector bulge 3524 of the second secondary roller 352 are jogged with each other, and one side wall 3519 of the sector bulge 3517 of the first secondary roller 351 is kept close together with one side wall 3526 of the sector bulge 3524 of the second secondary roller 352 at the initial position; first, a point $a_1$ is randomly selected on the pitch circle 35114 of the annular groove 3512, then the side wall 3519 of the sector bulge 3517 of the first secondary roller 351 can be determined by drawing an radial line from this point, a point $a_2$ is found from the point $a_1$ along the pitch circle 35114 of the annular groove 3512 in the anti-clockwise direction, to make the arc length of the pitch diameter of the annular groove 3512 between $a_1$ and $a_2$ equal to $D_1$-$D_2$ between the first secondary louver blade 91 and the second secondary louver blade 91 (see FIG. 29b), thus determining a neutral position between the sector bulge 3517 of the first secondary roller 351 and the sector bulge 3524 of the second secondary roller 352, and a point $a_3$ is found from the point $a_1$ along the pitch circle 35114 of the annular groove 3512 in the clockwise direction, the arc length of the pitch diameter of the annular groove 3512 between $a_1$ and $a_3$ is $S_1$, $S_1$ could be determined in the consideration of respective strength of the sector bulge 3517 of the first secondary roller 351 and the sector bulge 3524 of the second secondary roller 352, and if $S_1$ is determined, the circumferential sizes of the sector bulge 3517 of the first secondary roller 351 and the sector bulge 3524 of the second secondary roller 352 are determined.

FIG. 25 is the C-C sectional view of FIG. 20. The sector bulge 3529 of the second secondary roller 352 and the sector bulge 3534 of the third secondary roller 353 are jogged with each other, one side wall 35210 of the sector bulge 3529 of the second secondary roller 352 is kept close together with one side wall 3535 of the sector bulge 3534 of the third secondary roller 353 at the initial position; first, a point $b_1$ is randomly selected on the pitch circle 35114 of the annular groove 3522, then the side wall 35210 of the sector bulge 3529 of the second secondary roller 352 can be determined by drawing an radial line from this point, a point $b_2$ is found from the point $b_1$ along the pitch circle 35114 of the annular groove 3522 in the anti-clockwise direction, to make the arc length of the pitch diameter of the annular groove 3522 between $b_1$ and $b_2$ equal to $D_1$-$D_2$ between the second secondary louver blade 92 and the third secondary louver blade 93 (see FIG. 29c), thus determining a neutral position between the sector bulge 3529 of the second secondary roller 352 and the sector bulge 3534 of the third secondary roller 353, and a point $b_3$ is found from the point $b_1$ along the pitch circle 35114 of the annular groove 3522 in the clockwise direction, the arc length of the pitch diameter of the annular groove 3522 between $b_1$ and $b_3$ is $S_1$, $S_1$ could be determined in the consideration of respective strength of the sector bulge 3529 of the second secondary roller 351 and the sector bulge 3534 of the third secondary roller 353, and if $S_1$ is determined, the circumferential sizes of the sector bulge 3529 of the second secondary roller 352 and the sector bulge 3534 of the third secondary roller 353 are determined.

FIG. 26 is the D-D sectional view of FIG. 20. The annular through hole 3624 of the turning disc 362 is sheathed on the sector step 3549 on the closed end surface of the turning cylinder 354, thus the both are connected as a whole and located on the base by the fixed sleeve 361, resulting in that the angle between one side of the sector step 3549 on the closed end surface of the turning cylinder 354 at the initial position and one side of the convex platform 385 of the base 38 is equal to the turning closed angle $\phi$.

Figure 27A:
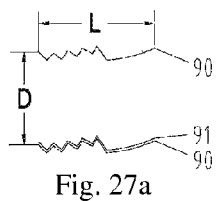
FIG. 27 is a cross-section schematic diagram of a combinatorial louver blade—a unit of a pitch-variable combinatorial louver which has one secondary louver blade and of which the primary and secondary louver blades turn over together.
Figure 27B:
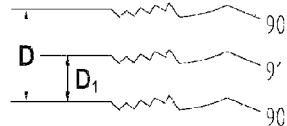
Figure 27C:
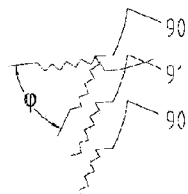
Figure 28A:
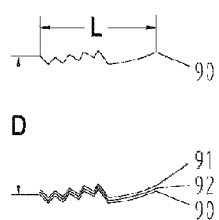
FIG. 28 is a cross-section schematic diagram of a combinatorial louver blade—a unit of a pitch-variable combinatorial louver which has two secondary louver blades and of which the primary and secondary louver blades turn over together.
Figure 28B:
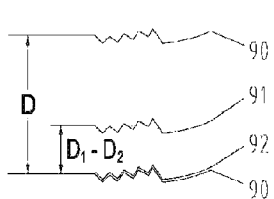
Figure 28C:
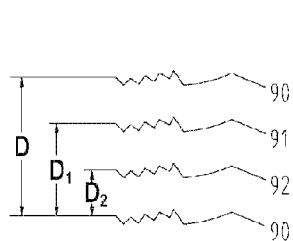
Figure 28D:
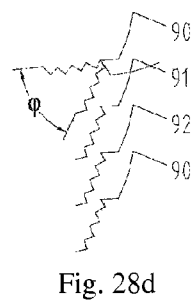

The design principle of the roller system of the pitch-variable combinatorial louver with one secondary louver blade (as shown in FIG. 27) and the roller system of the pitch-variable combinatorial louver with two secondary louver blades (as shown in FIG. 28) as well as the roller system of the pitch-variable combinatorial louver with more than four secondary louver blades is identical to the design principle of the above roller system applicable to the pitch-variable combinatorial louver with three secondary louver blade.

Figure 30A:
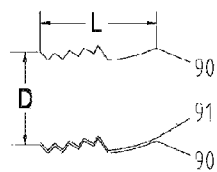
FIG. 30 is a cross-section schematic diagram of a combinatorial louver blade—a unit of a pitch-variable combinatorial louver which has one secondary louver blade and of which the primary louver blade does not turn over and the secondary louver blade turns over.
Figure 30B:
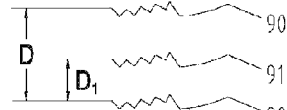
Figure 30C:
Figure 31A:
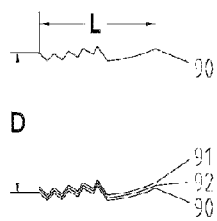
FIG. 31 is a cross-section schematic diagram of a combinatorial louver blade—a unit of a pitch-variable combinatorial louver which has two secondary louver blades and of which the primary louver blade does not turn over and the secondary louver blades turn over.
Figure 31B:
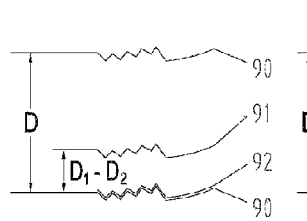
Figure 31C:
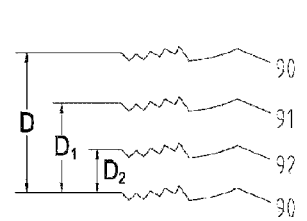
Figure 31D:
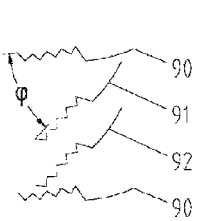
Figure 32A:
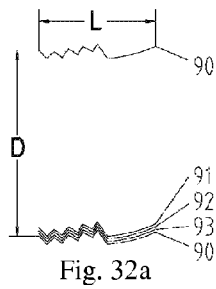
FIG. 32 is a cross-section schematic diagram of a combinatorial louver blade—a unit of a pitch-variable combinatorial louver which has three secondary louver blades and of which the primary louver blade does not turn over and the secondary louver blades turn over.
Figure 32B:
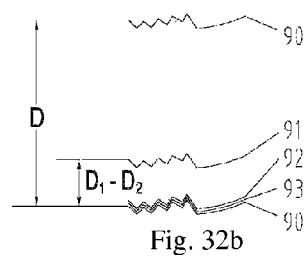
Figure 32C:
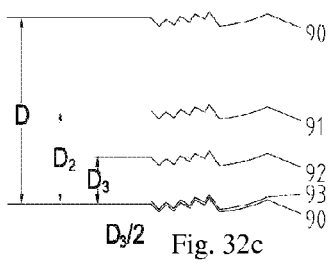
Figure 32D:
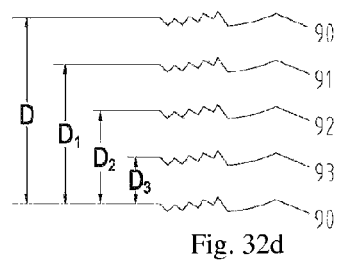
Figure 32E:
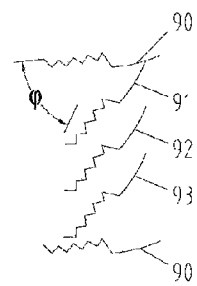

In the roller system described above, if only the upper end of the primary ladder tape fixed in the annular groove 3544 of the turning cylinder 354 is changed to be fixed on the top rail, it can be applied to the roller system of the pitch-variable combinatorial louver with one secondary louver blade (as shown in FIG. 30), the roller system of the pitch-variable combinatorial louver with two secondary louver blades (as shown in FIG. 31) and the roller system of the pitch-variable combinatorial louver with three secondary louver blades (as shown in FIG. 32) as well as the roller system of the pitch-variable combinatorial louver with more than four secondary louver blades.

In a word, the foregoing is preferred examples of the invention only, and equivalent changes and modifications made according to the application scope of the invention should be encompassed within the scope of the invention.

What is claimed is:
1. A louver roller mechanism for a louver, comprising: a turning cylinder (354) having an opening, wherein the louver comprises primary louver blades and secondary louver blades connecting to a primary ladder tape and a secondary ladder tape, respectively, and the louver roller mechanism controls movement of the primary louver blades and secondary louver blades; at least one roller is mounted in the turning cylinder (354); a turning cylinder cover (355) is mounted at the opening of the turning cylinder (354); the turning cylinder (354) and the turning cylinder cover (355) are sequentially and axially mounted on a rotating shaft (356); a square shaft (2) is mounted in the rotating shaft (356); the secondary ladder tape is fixed on the roller and comprises front and rear cords; and the roller rotates to drive the secondary louver blades to rise and fall while the secondary louver blades extend horizontally; annular grooves (3541, 3542, 3543 and 3544) are set on at outer ring surface of the turning cylinder (354); each annular groove (3541, 3542 and 3543) comprises an outer wall wherein there is hole (3545) on the outer wall facing up and two pin shafts (3546) are mounted diametrically across the hole; a pin shaft (35414) is mounted on the top of the annular groove (3544); the annular grooves (3541,3542, 3543 and 3544) are respectively wound with primary and secondary ladder tapes; upper ends of the front and rear cords of the secondary ladder tape pass through the hole (3545) between the two pin shafts (3546) of each of the annular grooves (3541, 3542 and 3543), go into the turning cylinder (354) and connect with the roller; upper ends of the front and rear cords of the primary ladder tape are fixed on the pin shaft (35414) on the top of the annular groove (3544) and connected with the turning cylinder; breast lines of the primary and secondary ladder tapes run through the louver blades, sector steps (3547 and 3549) axially extend out from an outer wall of a closed end surface of the turning cylinder (354) along the outer cylinder wall, and a raised key (35412) is axially set on the edge of the inner cylinder wall of the turning cylinder (354).

2. The louver roller mechanism according to claim 1, wherein the louver roller mechanism further comprises a first secondary roller (351), a second secondary roller (352) and a third secondary roller (353) axially mounted in the turning cylinder (354).

3. The louver roller mechanism according to claim 2, wherein: a raised key (3514) is set in an inner ring (3513) of the first secondary roller (351), and the raised key (3514) is matched with a slide way (3562) of the rotating shaft (356); a first sector bulge (3517) axially extends out from one side of the first secondary roller (351), and the first sector bulge (3517) rotates on a first concave platform (3528) of the second secondary roller (352); a second sector bulge (3524) is set on the same side of the concave platform (3528); a third sector bulge (3529) and a second concave platform (35212) are set on the other side of the second secondary roller (352); the concave platform (35212) is matched with an annular bulge (3534) of the third secondary roller (353); the annular bulge (3534) comprises an outer ring; the rotating shaft (156) drives the first secondary roller (351) to rotate, the first secondary roller (351) drives the second secondary roller (352) to rotate, and the second secondary roller (352) drives the third secondary roller (353) to rotate; two bulges (3537 and 3538) which are set in the outer ring of the annular bulge (3534) of the third secondary roller (353) and extend out of the outer ring are matched with the raised key (35412) on the inner cylinder wall of the turning cylinder (354).

4. The louver roller mechanism according to claim 2, wherein: each of the first secondary roller (351), the second secondary roller (352) and the third secondary roller (353) has an outer ring and an annular groove is set in each of the outer ring; a pin hole is set in each of the annular groove; a secondary ladder tape is embedded in each of the annular groove; and a pin shaft is inserted into each of the pin hole for fixing upper ends of the front and rear cords of corresponding secondary ladder tape.

5. A roller system with a gear clutch turning mechanism, comprising a base (38) and a top cover (39), wherein: the louver roller mechanism (35) according to claim 1 and a gear clutch turning mechanism (36) are set on the base (38); the louver roller mechanism (35) is wound with the primary and secondary ladder tapes; the louver roller mechanism (35) is in axial connection with the gear clutch turning mechanism (36), and the louver roller mechanism (35) and the gear clutch turning mechanism (36) are driven to rotate by the square shaft (2); the roller rotates to wind the secondary ladder tape thereon to achieve rising and falling of the secondary louver blades; and when the secondary louver blades rise to a predetermined position, the gear clutch turning mechanism (36) drives the turning cylinder (354) to rotate along with the roller so as to achieve turning of all primary and secondary louver blades.

6. The roller system with a gear clutch turning mechanism according to claim 5, wherein: the gear clutch turning mechanism (36) comprises a turning disc (362); the turning disc (362) is sheathed on a fixed sleeve (361) at one end of the fixed sleeve (361), and the other end of the fixed sleeve (361) is matched with an outer wall of a closed end surface of the turning cylinder (354); the turning disc (362) is matched with a torsion spring unlocking gear (364); a torsion spring (363) is set between the turning disc (362) and the torsion spring unlocking gear (364); the torsion spring (363) is sheathed on the fixed sleeve (361) and both its ends are respectively placed on a semi-annular wall (3628) of the turning disc (362); the torsion spring unlocking gear (364) is in matched connection with a clutch gear (365); a fixing nut (366) is screwed on a hollow screw (3653) on the other end of the clutch gear (365); and the fixed sleeve (361), the turning disc (362), the torsion spring unlocking gear (364) and the clutch gear (365) are sequentially and axially mounted on the rotating shaft (356).

7. The roller system with as gear clutch turning mechanism according to claim 6, wherein: one surface of the turning disc (362) is planar; a semi-annular wall (3628) is axially set on the other surface of the turning disc (362); an annular axial hole (3624) is also set on the turning disc (362); and the annular axial hole (3624) is matched with a sector step (3549) axially extending out from the closed end surface of the turning cylinder (354) along the cylinder wall.

8. The roller system with a gear clutch turning mechanism according to claim 6, wherein: an annular groove (3642) is set outside of the torsion spring unlocking gear (364); the annular groove (3642) is stuck on a support (384) of the base (38) and restricted in its axial movement; an inner ring gearwheel (3643) is set on an end surface of an inner ring (3647) of the torsion spring unlocking gear (364) on one side of the torsion spring unlocking near (364); the inner ring gearwheel (3643) is meshed with a clutch gearwheel (3657); a semi-annular wall (3644) axially extends out from the other side of the torsion spring unlocking gear (364); and the axial length and radius of the semi-annular wall (3644) are equal to those of the semi-annular wall (3628) of the turning disc (362).

9. The roller system with a gear clutch turning mechanism according to claim 6, wherein: the clutch gearwheel (3657) is set on one side of an annular disc (3651) of the clutch gear (365); a hollow screw (3653) is set on the other side of the annular disc (3651); an inner ring key (3654) is set in the hollow screw (3653); a screw thread is set outside the hollow screw (3653); the hollow screw (3653) is matched with the fixing nut (366); the fixing nut (366) is fixed on the base (38); the hollow screw (3653) moves in the fixing nut (366) axially; when the hollow screw (3653) gets close to the torsion spring unlocking gear (364), the clutch teeth (3657) is embedded in the inner ring teeth (3643) of the torsion spring unlocking gear (364); the torsion spring unlocking gear (364) is matched with the turning disc (362); and then the annular disc (3651) is jogged with the turning disc (362) as a whole to rotate synchronously.

* * * * *